No. 778,232. Patented December 27, 1904.

UNITED STATES PATENT OFFICE.

CARLETON ELLIS, OF BOSTON, MASSACHUSETTS.

COMPOSITION FOR CEMENTING CLOTH, WOOD, LEATHER, OR OTHER SUBSTANCES.

SPECIFICATION forming part of Letters Patent No. 778,232, dated December 27, 1904.

Application filed May 2, 1903. Serial No. 155,365.

*To all whom it may concern:*

Be it known that I, CARLETON ELLIS, of Boston, in the county of Suffolk and State of Massachusetts, have invented certain new and useful Improvements in Compositions for Cementing Cloth, Wood, Leather, or other Substances, of which the following is a specification.

My new composition for cementing cloth, wood, leather, or other substance consists of a solution of nitrocellulose compounds in a suitable solvent, with the addition of a softening agent. The solvent is preferably acetone, alcohol, amyl acetate, fusel-oil, anilin, nitrobenzol, acetic acid, or mixtures of these or other bodies which are good solvents for nitrocellulose compounds. The softening agents may be such substances as castor-oil, carbolic acid, creosote, naphthol, camphor, naphthalene, acetanilid, or the non-volatile esters of the fatty or aromatic acids. Shellac or gum resins or Venice turpentine, Canada balsam, &c., may be added to the nitrocellulose to give better body. The nitrocellulose used is preferably in the form of the lower nitrates, although the higher nitrates may be also employed.

A suitable cement for general use may be made by dissolving ten pounds nitrocellulose and four pounds of camphor in a mixture composed of eight gallons of acetone, one gallon amyl acetate, and one quart creosote. In the use of this cement if the material is porous apply a thin coat as a sizing to each surface. This will dry in a few minutes. Then rapidly apply a second coat. Pressing together is desirable after joining.

Up to the present time no waterproof cement has been produced which has proved to be strong and flexible and at the same time quick-drying. The object of this invention is to prepare such a cement. A solution of nitrocellulose compounds, as described above, gives a flexible quick-drying cement, which is given great strength by the addition of the softening agent described.

What I claim, and desire to secure by Letters Patent of the United States, is—

The herein-described cementing composition consisting of about ten pounds nitrocellulose and four pounds of camphor dissolved in a mixture composed of about eight gallons acetone, one gallon of amyl acetate and one quart creosote.

In testimony whereof I have affixed my signature in presence of two witnesses.

CARLETON ELLIS

Witnesses:
 HENRY B. CHALMERS,
 NATHANIEL L. FOSTER.